United States Patent [19]
Miyoshi et al.

[11] Patent Number: 5,584,953
[45] Date of Patent: Dec. 17, 1996

[54] METHOD OF MANUFACTURING A PHOTOGRAPHIC PRINTING PAPER SUPPORT

[75] Inventors: Takahito Miyoshi; Yasuo Nishikawa; Sugihiko Tada, all of Fujinomiya, Japan

[73] Assignee: Fuji Photo Film Co., Ltd., Kanagawa, Japan

[21] Appl. No.: 315,842

[22] Filed: Sep. 30, 1994

Related U.S. Application Data

[63] Continuation of Ser. No. 34,864, Mar. 19, 1993.

[30] Foreign Application Priority Data

Mar. 19, 1992 [JP] Japan .................................. 4-093408

[51] Int. Cl.$^6$ ............................ B29C 47/00; G03C 1/795
[52] U.S. Cl. ................................ 156/244.27; 156/244.11; 430/531; 430/533; 264/173.1; 264/175

[58] Field of Search .................................. 430/533, 531; 156/244.27, 244.11; 264/173.1, 175

[56] References Cited

U.S. PATENT DOCUMENTS

| | | | |
|---|---|---|---|
| 3,755,069 | 8/1973 | Crawford et al. | 430/538 |
| 3,948,709 | 4/1976 | Ida et al. | 156/244.27 |
| 4,238,280 | 12/1980 | Wallis et al. | 430/538 |
| 4,447,524 | 4/1984 | Uno et al. | 430/538 |
| 4,917,844 | 4/1990 | Komai et al. | 264/173.1 |

*Primary Examiner*—John S. Y. Chu
*Attorney, Agent, or Firm*—Sughrue, Mion, Zinn, Macpeak & Seas

[57] ABSTRACT

A method of manufacturing a photographic printing paper support wherein a composition consisting essentially of polyethylene terephthalate is hot extruded so as to cover at least one surface of the raw paper, this method being characterized in that after a hot extruded film of the aforesaid composition is discharged onto the raw paper on the nip roll, it is pressed in contact with the chilled roll.

11 Claims, 2 Drawing Sheets

METHOD OF MANUFACTURING A PHOTOGRAPHIC PRINTING PAPER SUPPORT

This is a continuation of Application Ser. No. 08/034,864 filed on Mar. 19, 1993.

FIELD OF THE INVENTION

This invention relates to a method of manufacturing a photographic printing paper support, and more particularly, to a method of manufacturing a photographic printing paper support characterized in that a composition consisting essentially of polyethylene terephthalate is hot extruded on a paper support.

BACKGROUND OF THE INVENTION

In photographic printing papers, the surface of the raw paper to be emulsion-coated is generally covered by a polyolefin layer in which titanium oxide has been dispersed by kneading so as to improve water resistance and light reflectance. However, although the polyolefin is very flexible and easy to work with, it is not very tough. It was therefore necessary to increase the thickness of the covering, which adversely affected the gloss.

The aforesaid problems inherent in photographic printing paper supports using polyolefin are resolved by using a composition containing essentially polyethylene terephthalate (PET) instead of polyolefin (Japanese Patent Application Hei 389983).

However, if the conventional method of hot extruding a composition containing mainly PET is used, and the hot extruded drip film falls very close to the nip point of the nip roll and chilled roll while the paper is being transported between them, the thickness of the laminated film in the width direction is generally not uniform and mass production is rendered difficult. In addition, it was not possible to obtain sufficient adhesive strength of the covering layer to the paper support.

The Inventors, as a result of intensive studies, found that a covering layer of uniform thickness can be obtained by allowing the hot drip film to fall onto the paper support on the nip roll. They also found that even more satisfactory results can be obtained by arranging the temperature of the nip roll to lie within the range 30°–250° C. but preferably within the range 50°–130° C., and by arranging the discharge direction of the hot extruded film to coincide with the tangential direction of the nip roll.

SUMMARY OF THE INVENTION

It is therefore a first object of this invention to provide a method of manufacturing a photographic printing paper support wherein the surface of the raw paper has a covering layer of uniform thickness consisting essentially of polyethylene terephthalate.

It is a second object of this invention to provide a method of manufacturing a photographic printing paper support wherein the adhesion between the covering layer consisting essentially of polyethylene terephthalate and the raw paper is improved.

The aforesaid first object of the invention is attained by a method of manufacturing a photographic printing paper support wherein a composition consisting essentially of polyethylene terephthalate is hot extruded so as to cover at least one surface of the raw paper, this method being characterized in that after a hot extruded film of the aforesaid composition is discharged onto the raw paper on the nip roll, it is pressed in contact with the chilled roll. The second object of the invention is attained by further arranging the temperature of the nip roll to lie within the range 30°–250° C.

DETAILED DESCRIPTION OF THE INVENTION

Figure 1:
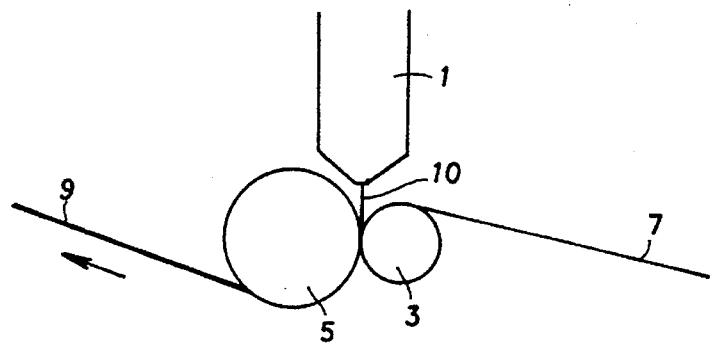
FIG. 1 shows the dropping position of the drip film from the T die according to the prior art.

In this invention, the composition consisting essentially of polyethylene terephthalate is understood to mean a composition consisting of polyethylene terephthalate resin (referred to hereafter as PET) alone, a mixed resin comprising no more than 60 weight % of another resin and PET, or the aforesaid resins also containing additives if necessary such as titanium oxide, fatty acid metal salts, ultramarine, antioxidants or antistatic agents.

In a concept of the PET used in the present invention, copolymers obtained by copolymerization of ordinal monomers such as terephthalic acid and ethylene glycol with no more than 50 weight % of another monomer (e.g. a dibasic acid such as isophthalic acid, or a glycol such as propylene glycol) are included.

The other resin which is blended with PET in a proportion of no more than 60 weight % may be suitably chosen from resins which can be extruded at a temperature of 270°–350° C. such as modified polyolefins(e.g., polyethylene, polypropylene, polypropylene copolymer, ethylene copolymer, ionomer and modified polyolefins wherein an unsaturated carboxylic acid have been graft polymerized), polyethers (e.g., polyethylene glycol, polyoxymethylene or polyoxypropylene), polyester polyurethane, polyether polyurethane, polycarbonate or polystyrene.

Two or more of these resins may also be used in conjunction, e.g. 6 parts by weight of polyethylene and 4 parts by weight of polypropylene may be blended with 90 parts by weight of PET.

If the aforesaid other resin is not a polyolefin resins, the blending ratio PET/other resin may lie within the range 99/1 –40/60. If the amount of PET is less than 40 weight %, physical properties often decline, and a support which is satisfactory for photographic printing paper cannot be obtained.

If a polyolefin is used as the resin to be blended with PET, it is convenient that the ratio PET/polyolefin resin lies within the range 99/1–80/20.

If the proportion of polyolefin is greater than 20 weight %, the physical properties of the mixed resin sharply decline. Further, as the Tg (glass transition temperature) of the photographic printing paper support falls, sufficient heat resistance is not obtained, and the effect of using PET is rendered inadequate.

According to this invention, it is particularly desirable that the covering layer on the surface of the paper to be emulsion-coated contains titanium oxide in order to increase light reflectance. Further, it is desirable that it also contains additives as may be required such as an antioxidant to prevent deterioration of the resin, an antistatic agent to prevent static build-up, and ultramarine or a fluorescent whitener to improve whiteness.

The mixing proportion of the resin component and titanium oxide expressed as a resin/titanium oxide ratio should lie in the range 98/2–50/50, but preferably in the range 95/5–70/30 and more preferably in the range 90/10–80/20.

If the amount of titanium oxide is less than 2 weight %, the whiteness is insufficient, while if it is greater than 50 weight %, the flatness of the surface is insufficient and a photographic printing paper support having excellent gloss cannot be obtained.

The titanium oxide used in this invention may be in the anatase or futile form. Its average particle size should preferably lie in the range 0.1–1.0μm, but more preferably in the range 0.2–0.6 μm.

The blending of PET with another resin, and the mixing of the resin with titanium oxide, may be easily performed by any of the usual methods. It is also desirable that surface treatment agents such as for example hydrated aluminum oxide, organopolysiloxane or 2–4 hydric alcohols are added to the titanium oxide surface in order to improve dispersion of the titanium oxide in the resin, and to prevent die lip soiling.

According to this invention, it is preferable that the thickness of the covering layer of the composition consisting essentially of PET lies within the range 5–50 μm, but more preferable that it lies within the range 10–30 μm.

If this thickness is greater than 50 μm, problems of physical properties appear such as cracking of the layer. On the other hand, if it is less than 5μm, the covering no longer fulfils its original function of repelling water, and the toughness of the support is inadequate.

By maintaining the toughness of the PET in the resin covering, the thickness of the resin layer can be less than in the case of a conventional polyolefin layer. The support itself can therefore be made thinner so that it is possible to provide a photographic printing paper which is cheap, does not take up much space and is easy to arrange in an album.

This invention will now be described in more detail with the aid of drawings.

Conventionally, when covering a raw paper 7 by a resin layer 9, a hot extruded drip film 10 delivered from a T die 1 was dropped near the nip point of a nip roll 3 and chilled roll 5 while feeding the raw paper 7 between the nip roll 3 and chilled roll 5 (FIG. 1).

Figure 2:
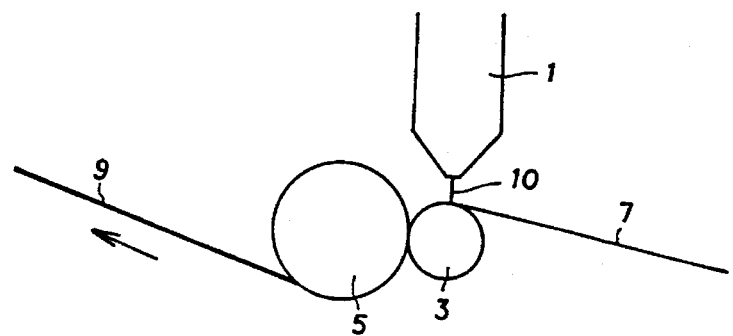
FIG. 2 shows the dropping position of the drip film from the T die according to this invention.
Figure 3:
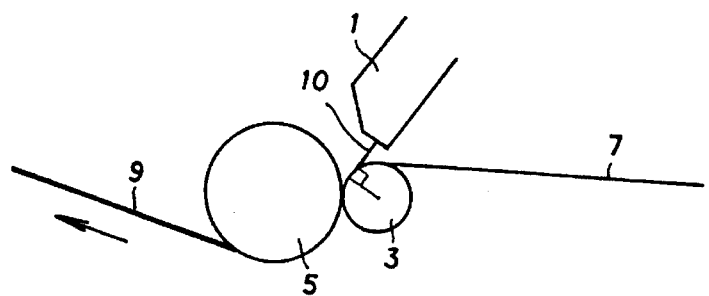
FIG. 3 shows the case where the discharge direction from the T die coincides with the tangential direction of the nip roll.
Figure 4:
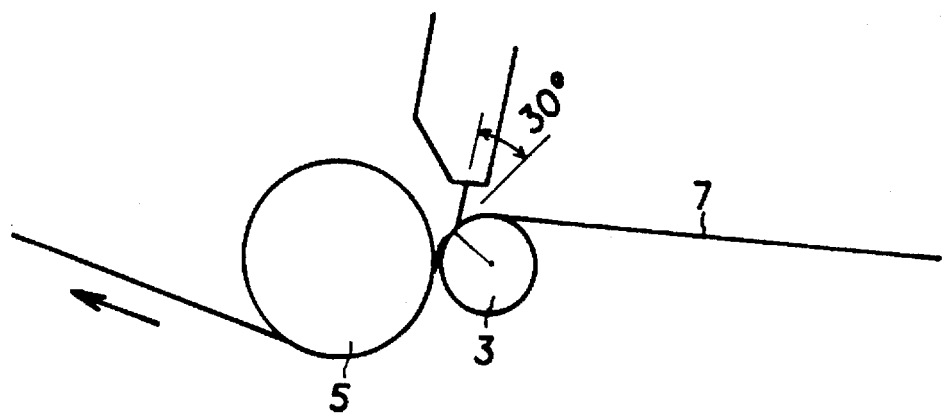
FIG. 4 shows the case where the discharge direction from the T die is 30° with respect to the tangential direction of the nip roll.
Figure 5:
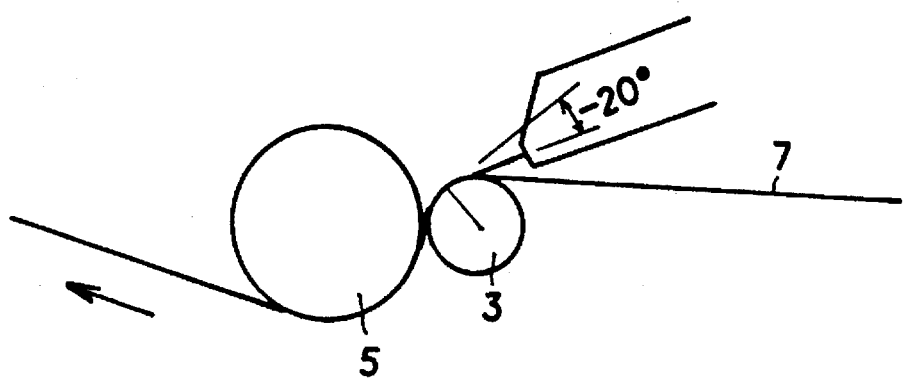
FIG. 5 shows the case where the discharge direction from the T die is −20° with respect to the tangential direction of the nip roll.

According to this invention, however, the hot extruded drip film is allowed to drop onto the paper support on the nip roll (FIG. 2). Although the reason is not well understood, by changing the dropping position of the hot extruded drip film in this way, the uniformity of the resin layer in the width direction which was previously difficult to achieve can be improved. Further, this uniformity depends on the direction in which the hot extruded film is discharged from the T die, particularly good results being obtained if this direction lies within the range −20°–+30 ° with respect to the tangential direction of the nip roll (FIG. 3–FIG. 5).

Further, the adhesion of the resin layer to the raw paper can be improved by arranging the temperature of the nip roll to lie within the range 30°–250° C. and preferably the range 50°–130° C.

The raw paper used as the paper support may be suitably chosen from any of the raw papers known in the art. A typical raw paper is manufactured from wood pulp as the principal raw material. The wood pulp may be the pulp of a coniferous tree or a broadleaf tree, but it is preferable to use a large quantity of broadleaf tree pulp which has short fibers and is conducive to obtaining smoothness. More specifically, it is preferable that at least 60 weight % of the pulp constituting the raw paper is broadleaf tree pulp.

If necessary, part of the wood pulp may be replaced by a synthetic pulp consisting of polyethylene, polypropylene etc., or a synthetic fiber consisting of polyester, polyvinyl alcohol nylon etc.

It is preferable that the freeness of the whole pulp is 200 to 400 ml according to CSF regulations. Further, regarding the beating degree. it is preferable that the 24+42 mesh residue is no greater than 40 weight % as specified by JIS-P-8207.

It is preferable that fillers such as calcium carbonate, talc, clay, kaolin, titanium dioxide and urea resin fines are added to the raw paper in order to improve smoothness. Of these, talc and clay are particularly to be preferred.

The raw paper used in this invention should preferably contain no less than 5 weight %, and more preferably no less than 10 weight %, of the aforesaid fillers.

Apart from the aforesaid fillers, other chemicals may also be added to the raw paper if necessary, for example internal sizing agents such as rosin, paraffin wax, higher fatty acid salts, alkenyl succinic acid salt alkenyl succinic anhydride, fatty acid anhydrides and alkyl ketene dimers; paper reinforcers such as pelyacrylamide, starch, polyvinyl alcohol and melamineformaldehyde condensate; softeners such as reaction products of maleic anhydride copolymer and polyalkylene polyamine, and quaternary ammonium salts of higher fatty acids; fixing agents such as ammonium sulfate and polyamide polyamine epichlorhydrin; colored dyes; and fluorescent dyes.

The raw paper used as the support, which employs the aforesaid raw materials, is manufactured in a long net paper machine or a circular net paper machine.

A photographic printing paper having excellent flatness, gloss and water repellent properties can then be obtained by applying a photographic emulsion, using any of the known procedures, to the surface of the support obtained as described hereintofore.

As described hereinabove, according to this invention, the thickness of a resin covering layer having PET as its main constituent can easily be made uniform, and the adhesion of the covering layer to a raw paper is adequate. This invention is therefore suited to the mass production of photographic printing paper supports having excellent gloss and flatness.

EXAMPLES

This invention will now be described in further detail by means of specific examples, but it should be understood that it is in no way limited by them.

EXAMPLES 1–4, and Comparative Example 1.

80 weight % of PET and 20 weight % of PET pellets containing 50 weight % of surface treated titanium oxide, were melted together at 300° C. in a biaxial mixing extruder.

The product, a molten resin containing 90 weight % PET and 10 weight titanium oxide, was extruded from a T die over a width of 10 cm, and applied to the surface of a raw paper of thickness 125 μm so as to form a film. To form the film, the temperature of the nip roll was adjusted as shown in Table 1, and the thickness of the extruded resin layer was measured over its whole width at 10 mm intervals. The results are shown in Table 1. The peeling strength of a sample of 1.5 cm width was also measured to estimate adhesive strength of the resin layer and shown together with other test results in Table 1.

TABLE 1

|   | Comp. Example 1 | Example 1 | Example 2 | Example 3 | Example 4 | Comp. Example 2 |
|---|---|---|---|---|---|---|
| A | FIG. 1 | FIG. 2 | FIG. 2 | FIG. 3 | FIG. 3 | FIG. 1 |
| B | 40° C. | 40° C. | 50° C. | 50° C. | 50° C. | 40° C. |
| C | 10 m/min | 10 m/min | 10 m/min | 10 m/min | 20 m/min | 20 m/min |
| D (0 cm) | 60 μm | 45 μm | 42 μm | 32 μm | 32 μm | 61 μm |
|   | 51 | 31 | 31 | 31 | 31 | 50 |
|   | 24 | 27 | 28 | 30 | 30 | 25 |
|   | 37 | 35 | 34 | 30 | 31 | 36 |
|   | 27 | 29 | 30 | 30 | 30 | 28 |
| (5 cm) | 33 | 31 | 30 | 30 | 30 | 34 |
|   | 24 | 26 | 27 | 29 | 29 | 26 |
|   | 37 | 35 | 33 | 30 | 30 | 36 |
|   | 26 | 28 | 29 | 30 | 31 | 26 |
|   | 53 | 33 | 31 | 31 | 31 | 53 |
| (10 cm) | 60 | 40 | 40 | 32 | 32 | 61 |
| F | 30 g | 60 g | 90 g | 90 g | 80 g | 55 g |

Comp.: Comparative
FIG.: Figure
A: The direction of T die
B: The temperature of the nip roll
C: The paper transportation rate
D: The thickness of the extruded resin layer
E: Positions along the paper width
F: The adhesive strength of a sample (1.5 cm width)

EXAMPLES 5, 6 and Comparative EXAMPLES 3, 4

An identical Procedure to that described in Examples 1–4 was followed except that the discharge angle from the T die was varied. The results shown in Table 2 were obtained.

TABLE 2

|   | Comp. Example 3 | Example 5 | Example 6 | Comp. Example 4 |
|---|---|---|---|---|
| A | FIG. 3 | FIG. 3 | FIG. 3 | FIG. 3 |
| B | 35° | 30° | −20° | −25° |
| C | 50° C. | 50° C. | 50° C. | 50° C. |
| D | 10 m/min | 10 m/min | 10 m/min | 10 m/min |
| E (0 cm) | 45 μm | 32 μm | 32 μm | 32 μm |
|   | 30 | 31 | 31 | 25 |
|   | 25 | 30 | 30 | 35 |
|   | 35 | 31 | 30 | 42 |
|   | 42 | 30 | 30 | 35 |
| (5 cm) | 35 | 31 | 30 | 22 |
|   | 22 | 29 | 29 | 30 |
| F | 30 | 30 | 30 | 40 |
|   | 40 | 30 | 29 | 30 |
|   | 35 | 31 | 31 | 25 |
| (10 cm) | 28 | 32 | 32 | 42 |

TABLE 2-continued

|   | Comp. Example 3 | Example 5 | Example 6 | Comp. Example 4 |
|---|---|---|---|---|
| G | 90 g | 90 g | 90 g | 90 g |

Comp.: Comparative
FIG.: Figure
A: The direction of T die
B: The angle of T die
C: The temperature of the nip roll
D: The paper transportation rate
E: The thickness of the extruded resin layer
F: Positions along the paper width
G: The adhesive strength of the laminated film (1.5 cm width)

EXAMPLES 7, 8 and Comparative EXAMPLES 5, 6

An identical procedure to that described in Examples 1–4 was followed except that the temperature of the nip roll was varied. The results shown in Table 3 were obtained. In Comparative Example 6, as part of the laminated film was not completely hardened by the chilled roll, part of the film was pulled by the chilled roll so that a stable film could not obtained.

TABLE 3

|   | Comp. Example 5 | Example 7 | Example 8 | Comp. Example 6 |
|---|---|---|---|---|
| A | FIG. 3 | FIG. 3 | FIG. 3 | FIG. 3 |
| B | 0° | 0° | 0° | 0° |
| C | 20° C. | 150° C. | 250° C. | 260° C. |
| D | 10 m/min | 10 m/min | 10 m/min | 10 m/min |
| E (0–10 cm) | 32 μm, 31, 30, 31, 30, 30, 29, 30, 31, 31, 32 | 32 μm, 31, 30, 30, 30, 30, 29, 30, 29, 31, 32 | 32 μm, 31, 30, 31, 30, 30, 29, 30, 31, 31, 32 | X |
| G | 30 g | 155 g | 230 g | — |

Comp.: Comparative
FIG.: Figure
A: The direction of T die
B: The angle of T die
C: The temperature of the nip roll
D: The paper transportation rate
E: The thickness of the extruded resin layer
F: Positions along the paper width
G: The adhesive strength of the laminated film (1.5 cm width)
X: Stable film could not be obtained

What is claimed is:

1. A method of manufacturing a photographic printing paper support wherein a composition consisting essentially of
   (1) a resin portion which is:
      (i) a polyethylene terephthalate resin alone, or
      (ii) a mixed resin comprising a polyethylene terephthalate copolymer resin or a polyethylene terephthalate homopolymer resin in combination with no more than 60 weight % of another resin, said another resin being at least one resin which can be extruded at 270°–350° C., and
   (2) an optional additive selected from the group consisting of titanium oxide, a fatty acid metal salt, ultramarine, an antioxidant and an antistatic agent,
   is hot extruded as a film at a temperature of 270°–350° C. from a T die onto raw paper which is on a nip roll prior to contact with a chilled roll, said nip roll having a temperature of 30°–250° C., wherein said film is hot extruded from the T die in a tangential direction which lies −20° to +30° with respect to the nip roll,
   and said hot extruded film is then pressed in contact with the chilled roll.

2. A method of manufacturing a photographic printing paper support of claim 1, wherein the resin portion is (i) the polyethylene terephthalate resin alone.

3. A method of manufacturing a photographic printing paper support of claim 2, wherein the polyethylene terephthalate resin is a copolymer of polyethylene terephthalate and more than 50 weight % of unit parts corresponding to terephthalic acid and ethylene glycol.

4. A method of manufacturing a photographic printing paper support of claim 1, wherein the resin portion is (ii) the mixed resin comprising the polyethylene terephthalate homopolymer resin in combination with no more than 60 weight % of another resin.

5. A method of manufacturing a photographic printing paper support of claim 1, wherein the blending ratio of the polyethylene terephthalate copolymer resin or the polyethylene terephthalate homopolymer resin and the another resin is within the range of 99/1–40/60.

6. A method of manufacturing a photographic printing paper support of claim 5, wherein the another resin is a polyolefin resin, and wherein the blending ratio of the polyethylene terephthalate copolymer resin or the polyethylene terephthalate homopolymer resin and the polyolefin resin is within the range of 99/1–80/20.

7. A method of manufacturing a photographic printing paper support of claim 1, wherein at least titanium oxide is used as one of the additives.

8. A method of manufacturing a photographic printing paper support of claim 7, wherein the mixing proportion of the resin component and titanium oxide expressed as a resin/titanium oxide ratio lies in the range 98/2–50/50.

9. A method of manufacturing a photographic printing paper support of claim 7, wherein the surface of titanium oxide is treated with a surface treatment agent.

10. A method of manufacturing a photographic printing paper support of claim 7, wherein the average particle size of titanium oxide is 0.1–1.0 μm.

11. A method of manufacturing a photographic printing paper support of claim 1, wherein the temperature of the nip roll is arranged to the range 50°–130° C.

* * * * *